(12) United States Patent
Noji

(10) Patent No.: US 6,296,031 B1
(45) Date of Patent: Oct. 2, 2001

(54) PNEUMATIC RADIAL TIRE INCLUDING A PLURALITY OF CARCASS PLIES WITH SPECIFIED FOLD BACK PORTIONS

(75) Inventor: Hikomitsu Noji, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 09/448,138

(22) Filed: Nov. 24, 1999

(30) Foreign Application Priority Data

Nov. 30, 1998 (JP) .................................. 10-340223

(51) Int. Cl.[7] ............................ B60C 15/00; B60C 15/06
(52) U.S. Cl. ........................................... 152/543; 152/554
(58) Field of Search .................................... 152/554, 543

(56) References Cited

U.S. PATENT DOCUMENTS 4,854,362 * 8/1989 Carolla et al. ........................ 152/554

* cited by examiner

*Primary Examiner*—Adrienne C. Johnstone
(74) *Attorney, Agent, or Firm*—Arent, Fox, Kintner, Plotkin & Kahn, PLLC

(57) ABSTRACT

A pneumatic radial tire in which both end portions of a plurality of carcass plies are mounted respectively to left and right bead cores to fold back from an inner side to an outer side of the tire. Fold back portions of the carcass plies constituting the outermost sides on inner sides of the bead cores are laminated onto unfolded portions of the carcass plies. Carcass cords of the carcass plies are intersected with each other between the laminated layers. A length of the fold back portion is longer than any of fold back portions of the remaining carcass plies.

5 Claims, 3 Drawing Sheets

PNEUMATIC RADIAL TIRE INCLUDING A PLURALITY OF CARCASS PLIES WITH SPECIFIED FOLD BACK PORTIONS

BACKGROUND OF THE INVENTION

The present invention relates to a pneumatic radial tire in which a carcass ply (carcass layer) is constructed by a semiradial structure, and, more particularly, to a pneumatic radial tire promoting driving stability without being accompanied by an increase in mass or a reduction in productivity of the tire.

In pneumatic radial tires, a tire in which a carcass cord of a carcass ply is arranged at an angle less than 90 degrees relative to a tire equator is particularly referred to as a semi-radial tire. Generally, according to a conventional semi-radial tire for a passenger vehicle, as shown by FIG. 3A, two carcass plies 21 and 22 in which the carcass cords intersect with each other between the plies, are arranged to reach the bead portions 25 of the tire from a tread portion 23 via left and right side portions 24. Both end portions are folded back to wrap the bead fillers 27 from the inner side to the outer side of the tire respectively around left and right bead cores 26. Further, the tread portion 23 is arranged with two belt layers 28 over the entire periphery of the tire along the peripheral direction of the tire on the outer side of the outer side carcass ply 21.

In the carcass plies 21 and 22, a fold back portion 21b of the carcass ply 21 constituting the outermost side on an inner side of the bead core 26 in the bead portion 25, is extended to the side of the tread portion 23 along an unfolded portion 21a of the carcass ply 21 (that is, main body portion). Further, a fold back portion 22b of the carcass ply 22 rides over a distal end 21e of the fold back portion 21b to cover the entire fold back portion 21b and is successively extended to the side of the tread portion 23 along the main body portion 21a. Therefore, a distal end 22e of the fold back portion 22b is disposed further radially toward the tread portion 23 relative to the distal end 21e of the fold back portion 21b.

According to the above-described conventional semi-radial tire, when it is intended to improve the driving stability, as a general conventional method, a reinforcement layer comprising steel cords or fiber cords is arranged on the outer side of the bead filler 27. However, such an additional arrangement of the reinforcement layer gives rise to an increase in a mass of the tire by that amount. This increases also the number of tire fabrication steps and thus results in a disadvantage resulting in a reduction in the productivity of the tire.

SUMMARY OF THE INVENTION

It is an object of the invention to provide a pneumatic radial tire which has improved driving stability while keeping mass and productivity thereof at the same levels as those of a conventional pneumatic radial tire.

In order to achieve the above-described object according to an aspect of the invention, there is provided a pneumatic radial tire comprising a plurality of carcass plies in which carcass cords of the carcass plies are inclined to a tire equator by an angle equal to or more than 65 degrees and less than 90 degrees and intersect with each other, both end portions of the carcass plies being mounted to fold back from an inner side to an outer side of the tire respectively around left and right bead cores and wherein a fold back portion of the carcass ply constituting an outermost side on an inner side of the bead core is laminated on an unfolded portion of the carcass ply, the carcass cords of the carcass plies intersect with each other between laminated layers thereof and a length of the fold back portion is longer than any of the fold back portions of the remaining carcass plies.

According to the invention, the length of the fold back portion of the carcass ply constituting the outermost side on the inner side of the bead core and extended from the main body portion (that is, the unfolded portion of the carcass ply), is longer than any of fold back portions of the remaining carcass plies. Therefore, a laminated layer region in which carcass cords intersect with each other between laminated layers of the main body portion and the fold back portion can be wider than that of the conventional tire of FIG. 3A and FIG. 3B. The laminated layer region in which the carcass cords intersect with each other in this way is provided with the flexural rigidity larger than that of the laminated layer region in which the carcass cords are parallel with each other between the layers. Therefore, according to the invention, compared with the conventional tire of FIG. 3A and FIG. 3B, the lateral rigidity of the side of the tire can be increased and the driving stability can be promoted.

Further, the number of the carcass plies and the number of tire fabrication steps remain the same as those in the conventional tire. Therefore, the tire mass is not increased and the productivity of the tire is not deteriorated.

DESCRIPTION OF THE PREFERRED EMBODIMENTS

Figure 1A:
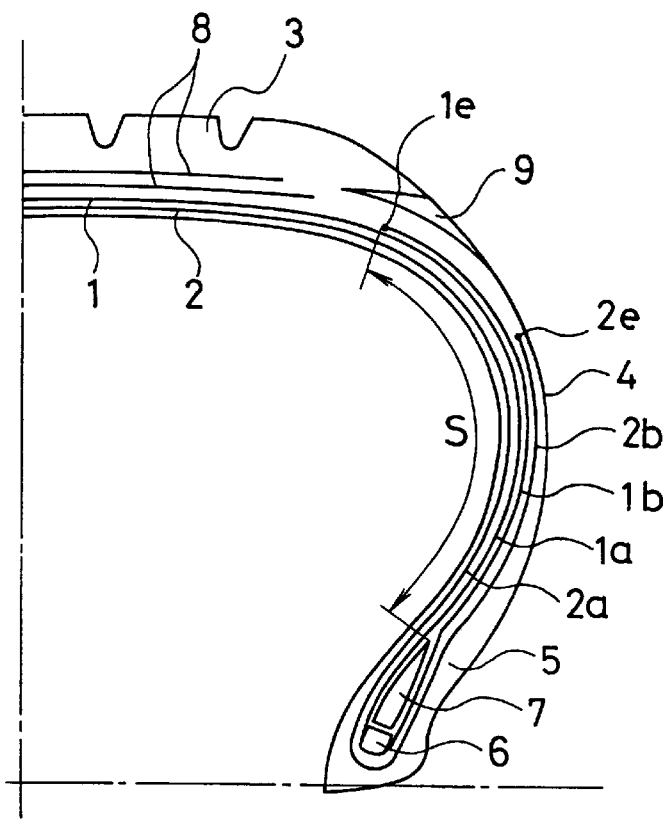
FIG. 1A is a semi-sectional view of a semi-radial tire for a passenger vehicle in a meridian direction thereof showing an embodiment of the invention.

According to a tire of the invention, as shown by FIG. 1A, two carcass plies 1 and 2 in which carcass cords are laminated to intersect with each other between the plies, are arranged to reach the bead portions 5 from a tread portion 3 via left and right side portions 4. Both end portions thereof are folded back to wrap the bead fillers 7 from the inner side to the outer side of the tire respectively around left and right bead cores 6. The respective carcass cords of the carcass plies 1 and 2 are inclined by an angle of less than 90 degrees relative to the tire equator. Further, the tread portion 3 is arranged with two belt layers 8 over the entire periphery of the tire along the peripheral direction of the tire on the outer side of the outer side carcass ply 1.

In the carcass plies 1 and 2, a fold back portion 1b of the carcass ply 1 constituting the outermost side on an inner side of the bead core 6 in the bead portion 5, is extended to an inner side of a wing tip 9 at a vicinity of an end portion of the shoulder along a main body portion 1a of the carcass ply 1 and is directly laminated on the main body portion 1a.

Further, a fold back portion 2b of the carcass ply 2 is extended to the side of the tread portion 3 along the fold back portion 1b and is directly laminated on the fold back portion 1b. A radially extending length of the fold back portion 1b is longer than a radially extending length of the fold back portion 2b. That is, a distal end 1e of the fold back portion 1b is disposed closer to or further radially toward the side of the tread portion 23 relative to a distal end 2e of the fold back portion 2b. Notation 2a designates a main body portion of the carcass ply 2.

Figure 1B:
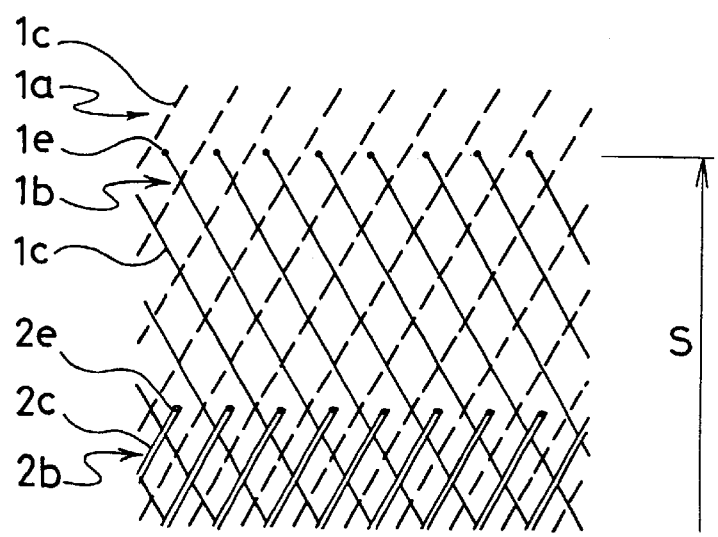
FIG. 1B is an explanatory view showing a laminated state of fold back portions in FIG. 1A.

Due to such a fold back structure of the carcass ply, as shown by FIG. 1B. the fold back portion 1b and the main body portion 1a are laminated to each other such that a carcass cord 1c of the fold back portion 1b and the carcass cord 1c of the main body portion 1a intersect each other in a region S excluding a portion where the bead filler 7 is interposed. When a relationship in which the carcass cords intersect with each other between the layers at a portion where the main body portion 1a and the fold back portion 1b are directly laminated to each other is established, the flexural rigidity of the laminated plies can be increased compared with a relationship in which the carcass cords are parallel with each other.

When the laminating relationship is investigated, although a portion of the overlapping layers of the conventional tire (FIG. 3A and FIG. 3B) in a region S' in which the fold back portion 21b is directly laminated on the main body portion 21a has a relationship in which the carcass cords 21c intersect with each other, the remaining portion in a region S" in which the fold back portion 22b is directly laminated on the main body portion 21a, has a relationship in which the carcass cords are parallel with each other. (That is, the carcass cord 22c of the fold back portion 22b and the carcass cord 21c of the main body portion 21a are parallel with each other).

Figure 3A:
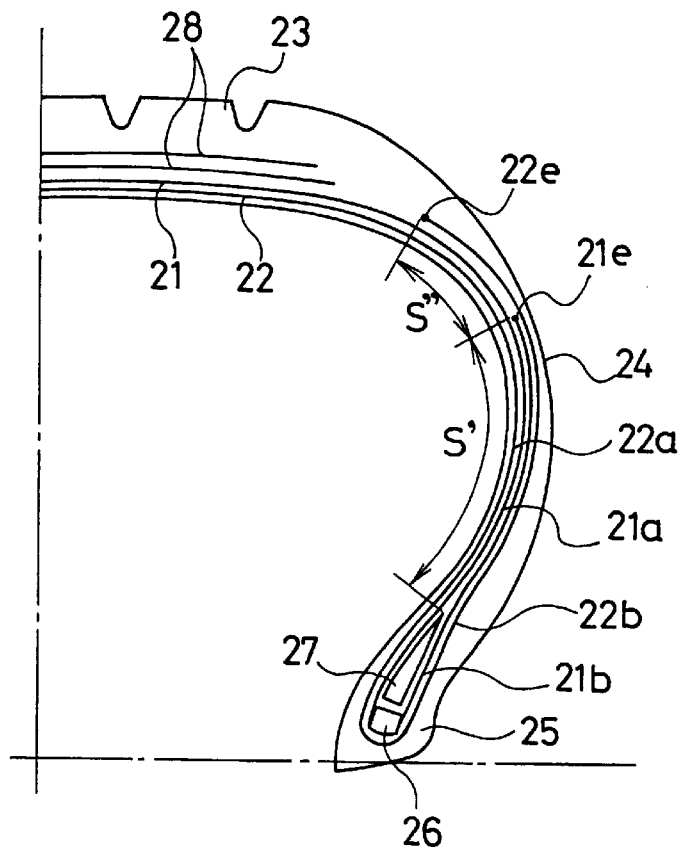
FIG. 3A is a semi-sectional view showing an example of a conventional semi-radial tire for a passenger vehicle in the meridian direction.
Figure 3B:
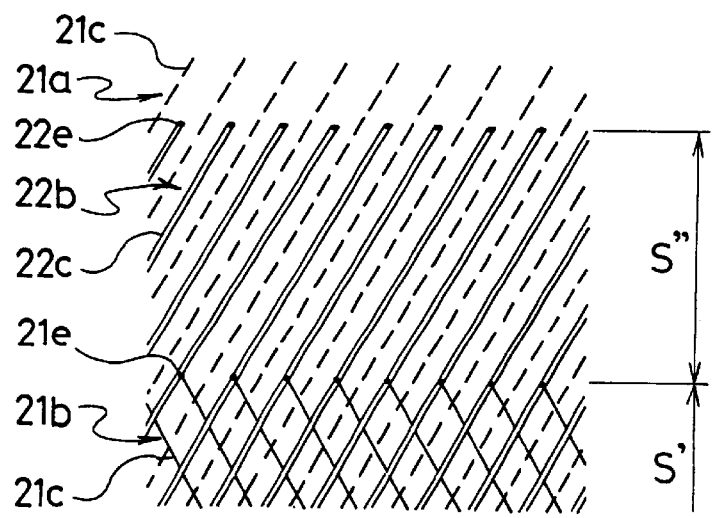
FIG. 3B is an explanatory view showing a laminated state of fold back portion~in FIG. 3A.

Accordingly, in comparing the tires of FIG. 1A and FIG. 3A, when tire sizes are the same and the number of the carcass plies is the same, S of FIG. 1A is equal to S'+S" of FIG. 3A and S>S' in the regions S and S' in which the carcass cords intersect with each other between the layers. Therefore, the flexural rigidity of the side portion of the tire of FIG. 1A is larger than that of the tire of FIG. 3A. Further, the driving stability is better. However, the quantitiy of materials to make both tires is quite the same, the fabrication steps also stay the same and therefore, the tire mass and the productivity stay quite the same.

Figure 2:
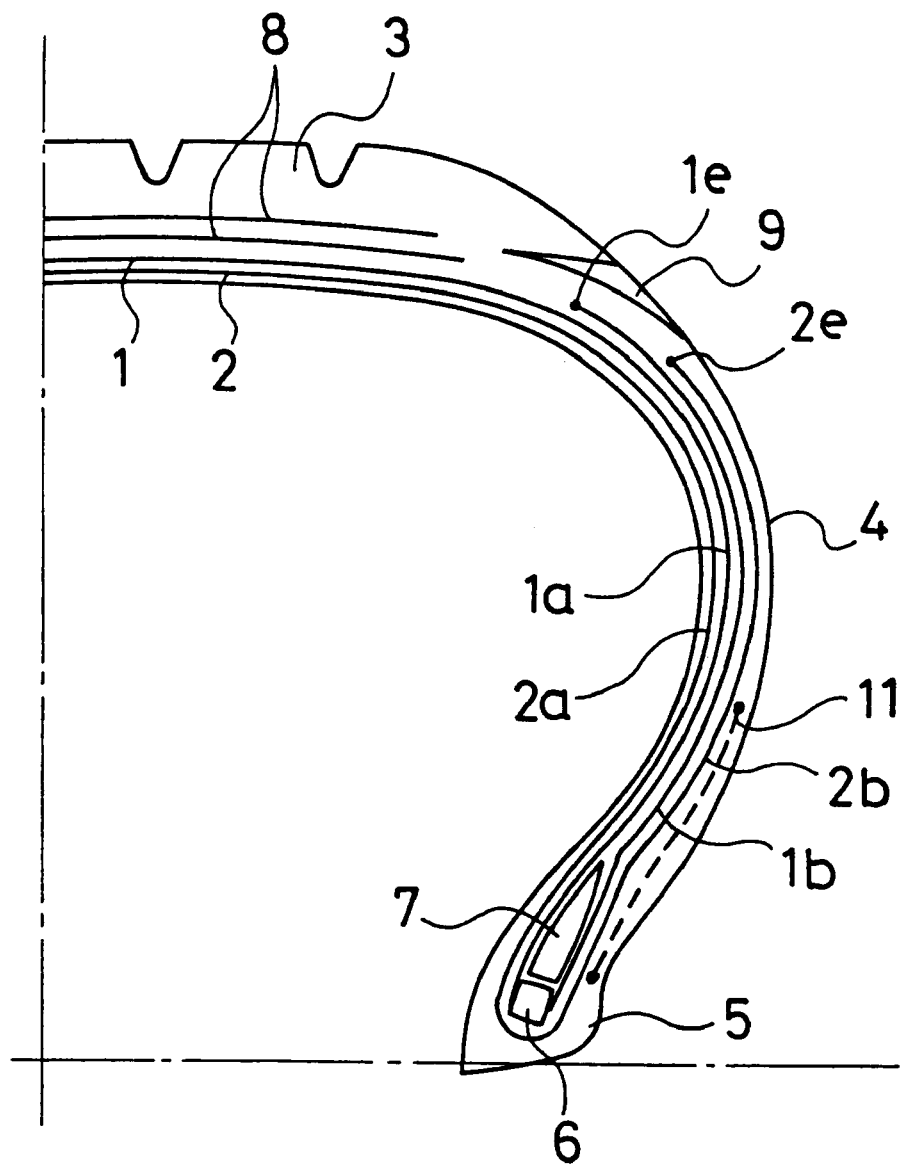
FIG. 2 is a semi-sectional view of a semi-radial tire for a passenger vehicle in the meridian direction showing other embodiment of the invention.

FIG. 2 is a semi-sectional view of a semi-radial tire in the meridian direction showing another embodiment of the invention.

The semi-radial tire has a constitution similar to that in the above-described embodiment except that a reinforcement layer 11 is arranged on the outer side of the fold back portions 1b and 2b of the carcass plies 1 and 2.

The reinforcement layer 11 comprises reinforcement cords of steel cords or organic fiber cords. The reinforcement cords intersect with the carcass cord 2c of the fold back portion 2b on the outermost side. According to such a tire, the rigidity of the bead portion 5 can further be increased.

According to the invention, it is preferable to use cords comprising organic fiber of nylon, polyester, aramid fiber or rayon as carcass cords for the carcass plies.

In respect of an angle of arranging the carcass cords, any conventional angle ranges which have been used in semi-radial tires are applicable. The angle ranges are preferably equal to or more than 65 degrees and less than 90 degrees relative to the tire equator, more preferably equal to or more than 65 degrees and less than 87 degrees. A number of the carcass cords (the number of ends) may also fall in a range which has been applied to the conventional semi-radial tire. The number is preferably 45 pieces through 55 pieces/ 50 mm at the tire equator.

Although the length of the fold back portion of the carcass ply is not particularly restricted, when the distal end is arranged to the tread side rather than a maximum width portion of the tire, the feature of the present invention can fully be utilized. It is preferable that the distal end of the fold back portion of the carcass ply laminated on the outermost side is extended to a vicinity of an edge portion of the tread shoulder, particularly to an inner side of the wing chip.

Although a number of the carcass plies is preferably two, the carcass plies can be laminated up to a maximum of four sheets.

EXAMPLES

A tire according to the invention and a conventional tire constructed by a common constitution are fabricated in which the tire size is 225/45R17. Two layers of carcass plies are arranged such that nylon 66 cords of 1260d/2 are inclined by 70 degrees relative to the tire equator. The number of ends thereof at the tire equator is 50 pieces/50 mm and by a constitution in which arrangement of distal ends of two fold back portions differ from each other as respectively shown by FIGS. 1A and 1B and FIGS. 3A and 3B. S=50 mm, S'=30 mm, S"=20 mm.

When lateral rigidity of side of tire and driving stability are measured under conditions, described below, in respect of the two kinds of semi-radial tires, the results in Table 1 have been obtained.

Lateral Rigidity of Side

The respective tires are filled with air under an internal pressure of 200 kPa and a total of the outer periphery of the tread portion is brought into a fixed state, a displacement in an axial direction of tire is applied from the rim and the reaction force is measured as the lateral rigidity of the side. An evaluation is carried out by inverse numbers and is designated by indices with an inverse number of a measured value of the conventional tire as 100. The larger the index value, the better the lateral rigidity of the side is. The result is shown in Table 1.

Driving Stability

Five professional test drivers run vehicles on a slalom test course erected with pylons at constant intervals and the driving stability is measured by a passing time period. An evaluation is carried out by inverse numbers of average values of passing time periods by the five test drivers and is designated by indices with an inverse number of an average value of a passing time period in the case of the conventional tire as 100. The larger the index value, the better the driving stability is. The result is shown in Table 1.

TABLE 1

|  | Side lateral rigidity | Driving stability |
| --- | --- | --- |
| Invented tire | 115 | 130 |
| Conventional tire | 100 | 100 |

As is apparent from Table 1, it is known that the invented tire is improved over the conventional tire in both side lateral rigidity and driving stability.

As has been described in details, according to the invention, in the tire having the semi-radial structure in which the carcass cords comprise a plurality of the carcass plies intersecting with each other, the fold back portion of the carcass ply constituting the outermost side on an inner side of the bead core, is laminated to the unfolded portion of the carcass ply (that is, main body portion), the carcass cords of the carcass plies intersect with each other between the laminated layers and the length of the fold back portion is made longer than any of the fold back portions of the other carcass plies. Accordingly, while making the mass and the productivity of the invented tire at the same levels as those of the conventional pneumatic radial tire, the region of laminating the carcass cords to intersect with each other between the layers can be maximized. Accordingly, the side lateral rigidity can be increased as large as possible and the driving stability can be promoted.

What is claimed is:

1. A pneumatic radial tire comprising:

a plurality of carcass plies in which carcass cords of the carcass plies are inclined to a tire equator by an angle equal to or more than 65 degrees and less than 90 degrees and intersect with each other between the plies, wherein both end portions of the carcass plies are mounted to fold back from an inner side to an outer side of the tire respectively around left and right bead cores; and wherein a fold back portion of the carcass ply constituting an outermost side on an inner side of the bead core in the plurality of carcass plies is laminated on an unfolded portion of the carcass ply, the carcass cords of the carcass plies intersect with each other between laminated layers thereof and a length of said fold back portion is longer than any of the fold back portions of the remaining carcass plies.

2. The pneumatic radial tire according to claim 1: wherein a distal end of the fold back portion of the carcass ply constituting the outermost side extends further radially toward a side of a tread portion than a maximum width portion of the tire.

3. The pneumatic radial tire according to claim 1: wherein a distal end of the fold back portion of the carcass ply constituting the outermost side extends to a vicinity of an edge portion of a tread shoulder.

4. The pneumatic radial tire according to claim 1: wherein a number of carcass plies is two through four.

5. The pneumatic radial tire according to claim 1, further comprising:

reinforcement layers arranged on outermost sides of the fold back portions of the plurality of carcass plies;

wherein reinforcement cords of the reinforcement layers and the carcass cords of the fold back portions on the outermost sides contiguous to the reinforcement layers intersect with each other.

* * * * *